United States Patent Office 3,696,079
Patented Oct. 3, 1972

3,696,079
PROCESS FOR THE PREPARATION OF POLY-VINYL CHLORIDE POLYMERIZATES SUITABLE FOR VINYL PASTES
Jobst Possberg, 65 Erkesstrasse, 5 Cologne, Germany; Kai Rostock, 65 Erkesstrasse, 5 Cologne-Longerich, Germany; Eligius Nickl, 87 Lindacherstrasse, 8263 Burghausen, Germany; and Otmar Zajicek and Helmut Klapp, both of 99 Alte Romerstrasse, 5 Cologne 71, Germany
No Drawing. Filed May 27, 1971, Ser. No. 147,657
Claims priority, application Germany, May 27, 1970, P 20 26 023.5
Int. Cl. C08f 3/30, 15/30, 47/02
U.S. Cl. 260—78.5 CL                        2 Claims

ABSTRACT OF THE DISCLOSURE

A process for the preparation of vinyl chloride polymerizates suitable for vinyl pastes which consists essentially of applying a thin layer of an aqueous vinyl chloride polymerizate dispersion prepared by polymerization of a stable, aqueous monomeric dispersion of vinyl chloride containing up to 20% by weight of ethylenically-unsaturated monomers copolymerizable with vinyl chloride prehomogenized in the presence of emulsifiers and oil-soluble catalysts to a roller drier by means of an application roller in contact with said aqueous polymerizate dispersion, drying said aqueous polymerizate dispersion in said thin layer on said roller drier at a temperature between about 90° C. to 110° C. to a moisture content of from 3% to 12% by weight, removing said partially dried vinyl chloride polymerizate powder from said drier roller, grinding said powder in an air stream at a temperature between 20° C.–40° C. until said powder has a moisture content of 0.3% by weight maximum and recovering a powdered vinyl chloride polymerizate suitable for vinyl pastes.

THE PRIOR ART

It has been known to process aqueous polyvinyl chloride dispersions, prepared by emulsion or suspension polymerizations, by means of roller drying. According to the process of German Pat. 870,033, the dispersions are sprayed onto a rotating heated cylinder, heated to 80° C. to 140° C., through binary nozzles. Partly continuous films of various thickness are formed thereby and are removed with scrapers and subsequently ground. By this means, a powder with a scaly structure is formed which can be stirred to a paste with the aid of plasticizers. This paste tends, however, to settling and has a gritty appearance.

It has been further known from German Pat. 1,108,910 to charge the polyvinyl chloride dispersions over an application roller onto a drying roller. By this means, a free-flowing product is obtained which, however, is unsuitable for pasting because of the too coarse granulation. However, for further processing through a worm extruder, this powder needs no further grinding.

In the two processes discussed, the moisture is practically completely removed in the roller drying step. The material to be dried is by these methods exposed to a too strong thermal strain and the primary particles of the polyvinyl chloride are altered, or even a continuous film is formed by sintering the primary granules.

OBJECTS OF THE INVENTION

An object of the present invention is the preparation of vinyl chloride polymerizates suitable for vinyl pastes through a two-step controlled drying of the emulsion of the polymerizate.

Another object of the invention is a process for the preparation of vinyl chloride polymerizates suitable for vinyl pastes which consists essentially of applying a thin layer of an aqueous vinyl chloride polymerizate dispersion prepared by polymerization of a stable, aqueous monomeric dispersion of vinyl chloride containing up to 20% by weight of ethylenically-unsaturated monomers copolymerizable with vinyl chloride prehomogenized in the presence of emulsifiers and oil-soluble catalysts to a roller drier by means of an application roller in contact with said aqueous polymerizate dispersion, drying said aqueous drier at a temperature between about 90° C. to 110° C. to a moisture content of from 3% to 12% by weight, removing said partially dried vinyl chloride polymerizate powder from said drier roller, grinding said powder in an air stream at a temperature between 20° C. to 40° C. until said powder has a moisture content of 0.3% by weight maximum and recovering a powdered vinyl chloride polymerizate suitable for vinyl pastes.

These and other objects of the invention will become more apparent as the description thereof proceeds.

DESCRIPTION OF THE INVENTION

The disadvantages of the prior art have been overcome and the above objects achieved by the present invention. A process has now been discovered for the preparation of vinyl chloride polymerizates and copolymerizates with up to 20% by weight of ethylenically-unsaturated monomers suitable for vinyl pastes, which polymerizates were prepared by polymerization of stable monomeric dispersions prepared by pre-homogenizing in the presence of emulsifiers and oil-soluble catalysts. The process of the invention is characterized in (1) that the dispersion, obtained after the polymerization is completed, is lead over an application roller to a drying roller and is dried on this roller at a temperature range of 90° C. to 110° C., preferably 100° C. to 105° C., to a moisture content of 3% to 12% by weight, preferably 4% to 6% by weight, and (2) that the thereby obtained powder is ground subsequently at temperatures between 20° C. and 40° C. in an air stream with simultaneous removal of the residual moisture to a moisture content of a maximum of 0.3% by weight.

With the aid of the process of the invention, it is possible to prepare in a simple way a polyvinyl chloride powder which is present in primary granulation and which is very well suited for the preparation of non-settling vinyl pastes, particularly of vinyl pastes which are subsequently subjected to foaming. In addition, no water, containing emulsifier, is obtained, and the sewage problems as they evolve, for instance, in the processing of dispersions by filtration can be avoided.

The preparation of the dispersions being utilized is known (for instance, German patent application 1,069,-387). In general, the work is done as follows.

A monomeric dispersion is prepared from the monomer or monomers, the oil-soluble catalyst, the emulsifiers, optionally the protective colloids or buffers as well as water by homogenization. The dispersion is then, mostly without further agitation polymerized at temperatures of between 30° C. and 80° C., under the autogenic pressure of the monomer (about 1 to 15 atmospheres).

The emulsification prior to polymerization can be attained by various apparatus, for instance, colloid mills, fast-running pumps, vibration agitators, ultrasonic devices, nozzles, and fast-running agitators which hurl the charged mixture onto deflecting surfaces.

Also the copolymerization of vinyl chloride with up to 20% by weight of ethylenically-unsaturated monomers copolymerizable with vinyl chloride is possible. Examples of such monomers are: the vinyl halides, such as vinyl fluoride, vinylidene fluoride, vinylidene chloride, vinyl bromide; vinyl esters of straight-chain or branched alkanoic acids with 2 to 20, preferably 2 to 4, carbon atoms, such as vinyl acetate, vinyl propionate, vinyl butyrate, vinyl-2-ethylhexoate, vinyl versatate ("Versatic" acid is a registered tradename of the Shell company for the commercially available mixtures of carboxylic acid, for instance, with 9 to 19 carbon atoms), vinyl isotridecanoic acid esters; vinyl ethers of lower alkanols, unsaturated acids, such as alkenedioic acids, for example, maleic, fumaric, itaconic, crotonic acids, alkenoic acids, for example, acrylic and methacrylic acids, and their mono or diesters with mono or dihydric alcohols with 1 to 10 carbon atoms; as well as olefins, such as ethylene, propylene, isobutylene, styrene, and acrylonitrile.

As catalysts are of interest oil-soluble free-radical formers in amounts of from 0.01% to 3% by weight, preferably 0.01% to 0.3% by weight, based on monomers, such as diarylperoxides, diacyl peroxides, such as diacetyl, acetylbenzoyl, dilauroyl, dibenzoyl, bis-2,4-dichlorobenzoylperoxides, dialkylperoxides, such as di-tertiary butylperoxide; peresters, such as tert. propyl peracetate, tert. butyl peracetate, tert. butyl peroctoate, tert. butyl perpivalate; dialkylperoxydicarbonates, such as diisopropyl-, diethylhexyl-, dicyclohexyl-, diethylcyclohexyl-peroxydicarbonates; mixed anhydrides of organic sulfoperacids and organic acids, such as acetylcyclohexylsulfonylperoxide, as well as azo compounds known as polymerization catalysts, such as azoisobutyric acid dinitrile and boroalkyls. Also mixtures of the named catalysts, such as dialkylpercarbonates and lauroylperoxide or acetylcyclohexylsulfonylperoxide and azoisobutyric acid dinitrile are important.

The emulsifiers may be ionic or non-ionic. They are used in amounts from 0.1% to 5% by weight, preferably 0.3% to 3% by weight, based on the monomers. As ionic emulsifiers preferably anionic-active substances are of interest. Examples for these are alkali and particularly ammonium salts of the fatty acids, such as lauric or palmitic acid, of the acid phosphoric acid alkylesters, such as sodium diethylhexyl phosphate, of the acid fatty alcohol sulfuric acid esters, the paraffin sulfonic esters, the alkylnaphthalenesulfonic acids and the sulfosuccinic acid dialkylesters. Very suitable are also alkali and ammonium salts of fatty acids containing epoxy groups, such as ammonium epoxystearate, for instance, the alkali and ammonium salts of the reaction products of peracids, such as peracetic acid with unsaturated fatty acids, for instance, oleic or linoleic acid with formation of perhaps dihydroxystearic acid and hydroxyacetoxystearic acid, as well as the alkali and ammonium salts of the reaction products of peracids with unsaturated hydroxy fatty acids, such as ricinoleic acid, but also cation active emulsifiers, such as laurylpryidinium hydrochloride may be used at times.

As examples for the non-ionic emulsifiers may be named partial fatty acid esters of polyhydric alcohols, such as glycerin monostearate, sorbitol monolaurate or palmitate, partial fatty alcohol esters of polycarboxylic acids, polyoxyethylene ethers of fatty alcohols or aromatic hydroxy compounds as well as the known polypropylene oxide-polyethylene oxide condensation products.

Optionally protective colloids, such as polyvinyl alcohol, which may also contain up to 40 mol percent acetyl groups, may further be added, also gelatins and cellulose derivatives, such as water-soluble methylcellulose, carboxymethylcellulose, hydroxyethylcellulose as well as mixed polymerizates of maleic acid or its half esters with styrene.

Also the use of buffers, such as sodium carbonate, sodium bicarbonate, alkali metal acetates, borax, alkali metal phosphates, ammonia or ammonium salts of carboxylic acids as well as chain length regulators, such as aliphatic aldehydes with 2 to 4 carbon atoms, chlorinated hydrocarbons, such as di- and trichloroethylene, chloroform, methylene chloride, mercaptans, propane and isobutylene is possible. In some cases buffers, for instance, secondary alkali metal phosphates, are also added to the dispersion after its preparation.

The drying of the dispersions, according to the invention, is carried out as follows.

The aqueous polyvinylchloride dispersions are removed with the aid of an application roller from a bath of these dispersions and applied in a homogenous layer on a drying roller, rotating oppositely, whose temperature is maintained between 90° C. and 110° C., preferably 100° C. to 105° C. The rotation speed of the drying roller is adjusted so that the duration on the roller is 2 to 5 seconds, preferably 3 to 4 seconds. By alteration of the distance of the application roller from the drying roller and of the rotation of both rollers, the drying conditions may be varied within the named limits and thus adjust for the most favorable conditions for the various dispersions. Preferably, the dispersion is applied on the roller drier by the application roller in thin layers with the distance between the rollers being from 0.1 to 0.5 mm.

Because of the short duration on the drying roller and the low temperatures, a powder of a loosely agglomerated spherical primary grain is obtained which still contains a residual moisture of 3% to 12% by weight.

The subsequent grinding is carried out in known mills, such as pin-type-, jet- or hammer mills. Thereby the agglomerates, as electron-microscopical tests show, are crushed to the primary granulate (about 0.01 to $2\mu$) and at the same time by an air stream the water content reduced to below 0.3% by weight. The air stream is at a large rate of air flow and thereby the heating of the milled material to above 40° C. is avoided.

Different dispersions may also be mixed and then brought to drying. By this a homogenous distribution of the various polymerizate granulates in the polyvinyl chloride powder is attained.

In the pasting of the obtained powders with plasticizers, a vinyl paste, stable for storage, with good rheological properties is obtained which in the further processing of vinyl pastes in the coating, dipping or rotation processes gives products of outstanding qualities.

The following examples are illustrative of the practice of the invention without being limitative in any respect.

Example 1

50 parts of vinyl chloride, 50 parts of water, 0.5 parts of sodium dodecylbenzenesulfonate ("Marlon") and 0.075 part of lauroylperoxide are pre-emulsified and polymerized at 36° C. for 24 hours. The fine dispersion of polyvinylchloride (solids content 42% by weight, K-value 78.1) thus obtained, is charged into a tank. An application roller of 14.3 cm. diameter and a speed of rotation of 36 r.p.m. dips into this tank. At the distance, $d=0.2$ mm., a drying roller of 35 cm. diameter and a speed of rotation of 12 r.p.m. rotates oppositely. Thereby the product is in contact with the drying roller for a duration of 3.5 sec. The heating temperature is 105° C. The application load of the dispersion is 0.005 g. per $cm.^2$ of heated surface. The free-flowing product removed from the roller has a residual moisture of 4% by weight of $H_2O$. In the subsequent grinding in a jet mill, maintaining a temperature between 20° C. and 40° C. with an air stream, the slightly agglomerated particles are transformed to their spherical primary particles of the size 0.1 to $2\mu$. The final moisture content is simultaneously reduced to 0.1% by weight of $H_2O$. The spherical primary particles thus obtained give in the admixture with plasticizers, for instance, dioctylphthalate, a good workable vinyl paste. It is not necessary to heat the plasticizers or the polyvinyl chloride in order to form the vinyl paste. Also after storage of several days, no settling of the polyvinylchloride particles is observed. A paste consisting of 60 parts of polyvinylchloride and 40 parts of dioctylphthalate has, at a shearing slope of 1.0 sec.$^{-1}$, a viscosity of 2000 cp. The paste itself is homogenous in its properties and can be processed without difficulties by coating, dipping and rotation casting.

Example 2

A fine dispersion (45% by weight solids content, K-value 65) which contains a mixed polymerizate consisting of 90 parts of vinyl chloride and 10 parts of vinyl acetate is prepared from 45 parts of vinyl chloride, 5 parts of vinyl acetate, 50 parts of water, 0.5 part of sodium laurylsulfate and 0.075 part of lauroylperoxide at 47° C. in 20 hours.

At a heating temperature of 95° C. this dispersion is dried on a roller drier under the conditions named in Example 1. The free-flowing powder obtained thereby has a residual moisture of 6% by weight of $H_2O$. In the subsequent grinding in a sifter mill under the conditions of the invention, the final moisture is reduced to 0.25% by weight.

The mixed polymerizate thus obtained gives, with the admixture of a plasticizer, a good workable paste that does not tend to settling and has a good stability in storage.

Example 3

A fine dispersion of polyvinylchloride is prepared at 45° C. in 24 hours from 49.5 parts of vinyl chloride, 0.5 part of propylene, 50 parts of water, 0.5 part of a sodium higher alkylsulfonate ("Mersolate") and 0.15 part of lauroylperoxide+0.05 part of diethylhexylperoxydicarbonate (solids content 46.5%, K-value 67). This dispersion is dried at a heating temperature of 105° C. on the roller drier under the conditions listed in Example 1. The free-flowing powder obtained has a residual moisture of 5% by weight. In the subsequent grinding in a sifter mill under the conditions of the invention, the final moisture content is reduced to 0.25%. The mixed polymerizate thus obtained gives with an admixture of a plasticizer a good workable paste which does not tend to settling even after stroage of several days. The mixed polymerizate prepared according to this example is particularly well suited for pastes that are used in the coating sector and for foamed synthetic leather.

The preceding specific embodiments are illustrative of the practice of the invention. It is to be understood, however, that other expedients known to those skilled in the art or discussed herein may be employed without departing from the spirit of the invention or the scope of the appended claims.

We claim:
1. A process for the preparation of vinyl chloride polymerizates suitable for vinyl pastes which consists essentially of applying a thin layer of an aqueous vinyl chloride polymerizate dispersion prepared by polymerization of a stable, aqueous monomeric dispersion of vinyl chloride containing up to 20% by weight of ethylenically-unsaturated monomers copolymerizable with vinyl chloride prehomogenized in the presence of emulsifiers and oil-soluble catalysts to a roller drier by means of an application roller in contact with said aqueous polymerizate dispersion, drying said aqueous polymerizate dispersion in said thin layer on said roller drier at a temperature between about 90° C. to 110° C. to a moisture content of from 3% to 12% by weight, removing said partially dried vinyl chloride polymerizate powder from said drier roller, grinding said powder in an air stream at a temperature between 20° C. to 40° C. until said powder has a moisture content of 0.3% by weight maximum and recovering a powdered vinyl chloride polymerizate suitable for vinyl pastes.

2. The process of claim 1 wherein said aqueous polymerizate dispersion is dried on said roller drier at temperatures between 100° C. and 105° C., to a moisture content of from 4% to 6% by weight.

References Cited

UNITED STATES PATENTS 2,831,840    4/1958    Lindeboom _____ 260—92.8 A

JAMES A. SEIDLECK, Primary Examiner

J. A. DONAHUE, JR., Assistant Examiner

U.S. Cl. X.R.

260—75 H, 85.5 X, 86.3, 87.5 R, 87.1, 87.5 A, 87.56, 87.7, 92.8 A